United States Patent
Shi

(10) Patent No.: US 11,048,363 B2
(45) Date of Patent: Jun. 29, 2021

(54) FLOATING DISPLAY DEVICE AND METHOD FOR A FLOATING DISPLAY DEVICE TO INDICATE TOUCH POSITION

(71) Applicant: BOE TECHNOLOGY GROUP CO., LTD., Beijing (CN)

(72) Inventor: Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 235 days.

(21) Appl. No.: 16/242,486

(22) Filed: Jan. 8, 2019

(65) Prior Publication Data
US 2019/0369805 A1 Dec. 5, 2019

(30) Foreign Application Priority Data

May 29, 2018 (CN) .......................... 201810530465.6

(51) Int. Cl.
*G06F 3/042* (2006.01)
*G02B 26/08* (2006.01)
*G02B 30/00* (2020.01)

(52) U.S. Cl.
CPC ....... *G06F 3/0421* (2013.01); *G02B 26/0833* (2013.01); *G02B 30/00* (2020.01)

(58) Field of Classification Search
CPC .... G06F 3/0416; G06F 3/04166; G06F 3/016; G06F 3/0488; G02B 30/56; G02B 19/009; G02B 5/124; G02B 5/136; G02B 5/32
See application file for complete search history.

(56) References Cited

U.S. PATENT DOCUMENTS

| | | | | |
|---|---|---|---|---|
| 2015/0277610 A1* | 10/2015 | Kim | ........................ | G06F 3/016 345/173 |
| 2016/0328146 A1* | 11/2016 | Jing | ........................ | G06F 3/041 |
| 2017/0315587 A1* | 11/2017 | Kemppinen | ............ | G06F 3/016 |
| 2019/0179160 A1* | 6/2019 | Ito | ........................ | G02B 17/006 |

FOREIGN PATENT DOCUMENTS

| | | |
|---|---|---|
| CN | 103383731 A | 11/2013 |
| CN | 103677240 A | 3/2014 |
| CN | 104777999 A | 7/2015 |
| CN | 106560733 A | 4/2017 |
| JP | 2014516186 A | 7/2014 |

OTHER PUBLICATIONS

China First Office Action, Application No. 201810530465.6, dated Dec. 18, 2019, 20 pps.: with English translation.
China Second Office Action, Application No. 201810530465.6, dated Jul. 8, 2020, 20 pps.: with English translation.

\* cited by examiner

*Primary Examiner* — Gerald Johnson
(74) *Attorney, Agent, or Firm* — Armstrong Teasdale LLP

(57) ABSTRACT

The present disclosure relates to a floating display device and a method for a floating display device to indicate a touch position. The floating display device includes a touch marking unit. The floating display device is configured to generate a floating image in a floating imaging region, and the touch marking unit is configured to project a touch mark for marking an area where a touch object intersects the floating imaging region.

12 Claims, 3 Drawing Sheets

FLOATING DISPLAY DEVICE AND METHOD FOR A FLOATING DISPLAY DEVICE TO INDICATE TOUCH POSITION

CROSS REFERENCE TO RELATED APPLICATIONS

This patent application claims the benefit and priority of Chinese Patent Application No. 201810530465.6 filed on May 29, 2018, the disclosure of which is incorporated by reference herein in its entirety as part of the present application.

BACKGROUND

The present disclosure relates to a field of display technology. More particularly, it relates to a floating display device and a method for indicating a touch position for a floating display device.

The floating display can be separated from the display device to create a unique display effect, which can be widely used in exhibitions, commercials, public information tips, and other fields. With the increase in the amount of information and the personalized data needs of users, a display technology has changed from a simple formation display to a human-machine information interaction display. The traditional touch interaction method has been greatly challenged by the floating display because the latter does not need a physical medium any more.

BRIEF DESCRIPTION

Embodiments of the present disclosure provide a floating display device and a method for a floating display device to indicate a touch position.

Embodiments of the present disclosure provide a floating display device. The floating display device includes a touch marking unit, the floating display device is configured to generate a floating image in a floating imaging region, and the touch marking unit is configured to project a touch mark for marking an area where a touch object intersects the floating imaging region.

In some embodiments, the touch marking unit is configured to scan the touch mark along a plane in which the floating imaging region is located to mark the area where the touch object intersects the floating imaging region.

In some embodiments, the floating display device further includes a touch object locating unit configured to determine a position of the area where the touch object intersects the floating imaging region, so that the touch marking unit projects the touch mark at the location.

In some embodiments, the touch marking unit includes a laser, a MEMS reflector for changing a projection direction of a laser light generated by the laser, and a projection lens for projecting the laser light from the MEMS reflector to display the touch mark.

In some embodiments, the touch object locating unit includes a line-scan laser radar configured to scan a laser light along a plane in which the floating imaging region is located.

In some embodiments, the touch object location unit includes a depth camera.

In some embodiments, the laser light includes a visible laser.

In some embodiments, the floating display device further includes a control device, wherein the control device is configured to, based on the area where a touch object intersects the floating imaging region determined by the touch object locating unit, control the touch marking unit to project the touch mark to the area, or the control device is configured to control the touch marking unit to scan at a predetermined frequency the touch mark along a plane in which the floating imaging region is located.

In some embodiments, the floating display device further includes a display unit and a floating imaging unit configured to generate a floating image in the floating imaging region based on information from the display unit.

Embodiments of the present disclosure provide a method for a floating display device to indicate a touch position.

A second aspect of the present disclosure provides a method for a floating display device to indicate a touch position. The floating display device includes the floating display device as described above. The method includes projecting a touch mark for marking an area where the touch object intersects the floating imaging region.

In some embodiments, the projecting touch mark includes obtaining a position of the area where the touch object intersects the floating imaging region, and projecting the touch mark to the position.

In some embodiments, projecting the touch mark includes the projected touch mark scanning, at a predetermined frequency, the touch mark along a plane in which the floating imaging region is located.

BRIEF DESCRIPTION OF THE DRAWINGS

To describe the technical solutions in the embodiments of the present disclosure more clearly, the accompanying drawings of the embodiments are briefly described below. It should be understood that the drawings described below refer only to some embodiments of the present disclosure, and not to restrict the present disclosure, wherein.

DETAILED DESCRIPTION

Figure 1:
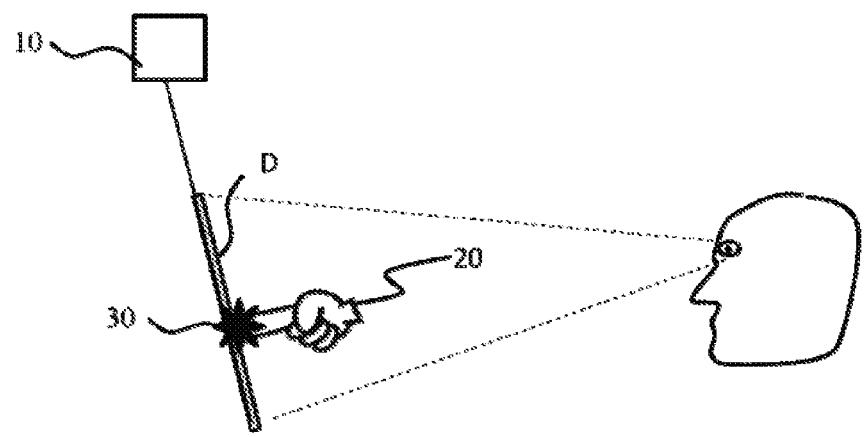
FIG. 1 is a schematic view of a floating display device according to embodiments of the present disclosure.

In order to make the technical solutions and advantages of the embodiments of the present disclosure more comprehensible, the technical solutions of the embodiments of the present disclosure are clearly and completely described below with reference to the accompanying drawings. Obviously, the described embodiments are only a part but not all of the embodiments of the present disclosure. Based on the described embodiments of the present disclosure, all other embodiments obtained by those skilled in the art without creative efforts shall also fall within the protection scope of the present disclosure.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively.

For purposes of the description hereinafter, the terms "upper", "lower", "right", "left", "vertical", "horizontal", "top", "bottom", and derivatives thereof shall relate to the disclosure, as it is oriented in the drawing figures. The terms "overlying", "atop", "positioned on" or "positioned atop" means that a first element, such as a first structure, is present on a second element, such as a second structure, wherein intervening elements, such as an interface structure, e.g., interface layer, may be present between the first element and the second element. The term "direct contact" means that a first element, such as a first structure, and a second element, such as a second structure, are connected without any intermediary conducting, insulating or semiconductor layers at the interface of the two elements.

There is no need for a physical carrier for touch control of a floating display. Thus, an operator needs to more accurately locate the spatial position of the finger in order to accurately achieve the touch operation, which will undoubtedly increase the visual and psychological burden of the operator and reduce the human-computer interaction experience.

Embodiments of the present disclosure provide a floating display device including a touch marking unit. The floating display device is configured to generate a floating image in a floating imaging region. The touch marking unit is configured to project a touch mark. The touch mark is used to mark an area where a touch object (for example, a finger) intersects the floating imaging region.

FIG. 1 is a schematic view of a floating display device according to embodiments of the present disclosure. As shown in FIG. 1, a floating display device according to embodiments of the present disclosure has a floating imaging region, wherein the floating display device is capable of generating a floating image in the floating imaging region D. The floating display device includes a touch marking unit 10. The touch marking unit 10 is configured to project a touch mark 30. The touch mark 30 is used to mark an area (see "P" of FIG. 2) where the touch object 20 intersects the floating imaging region D. With the touch marking unit 10, the touch mark 30 can be used to mark the area where the touch object 20 intersects the floating imaging region, thereby marking which part of the touch object intersects the floating imaging region. The embodiments of the present disclosure can at least more accurately locate the effective active portion of the touch object (i.e., the portion where the touch object intersects the floating imaging region D), thereby facilitating human-machine interaction of the floating display device and avoiding disoperation caused by positioning mistakes.

The touch mark herein refers to a mark that can be used to mark an area where the touch object intersects the floating imaging region to facilitate human-computer interaction. The touch mark can be a visually visible mark. For example, the touch mark can include at least one of a light spot, an arrow, a cross, and the like.

It can be understood that although the touch object is taken as a finger as an example in the figure. The touch object may include at least one of other parts of the body, a simulated finger, or a touch bar. The touch object is taken as a finger as an example in the following description.

Figure 2:
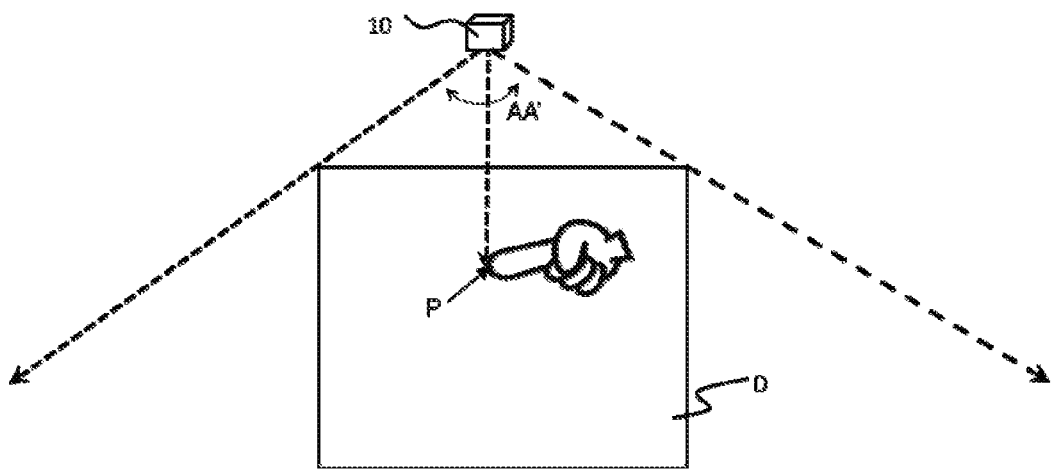
FIG. 2 is a schematic view of a floating display device according to embodiments of the present disclosure.

FIG. 2 illustrates an operation of the touch marking unit 10 according to embodiments of the present disclosure. As shown in FIG. 2, the touch marking unit 10 can scan the touch mark 30 along the plane in which the floating imaging region D is located to mark the area P where the touch object 20 intersects the floating imaging region D. The scanning range AA' of the touch marking unit 10 can be set to completely cover the floating imaging region D to enable scanning of each portion of the floating imaging region. However, it is also possible to set the scanning range of the touch marking unit to cover a specific portion of the floating imaging region as needed.

Figure 3:
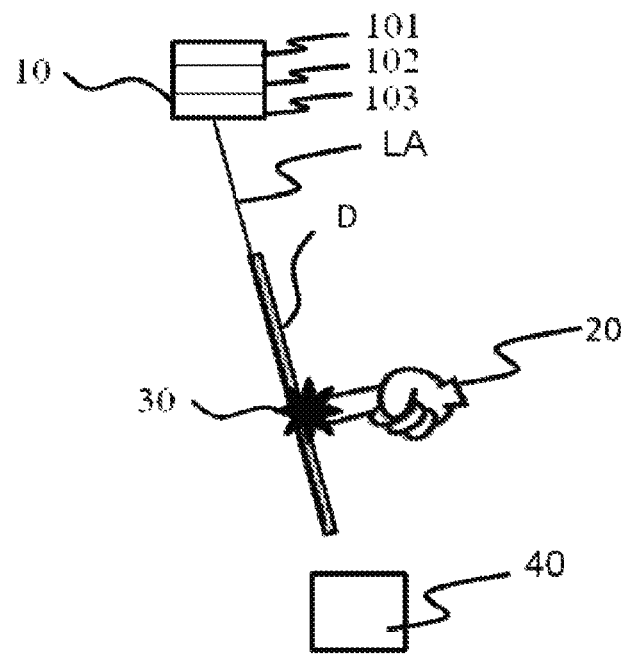
FIG. 3 is a schematic view of a floating display device according to embodiments of the present disclosure.

FIG. 3 is a schematic view of a floating display device according to embodiments of the present disclosure. As shown in FIG. 3, the floating display device according to embodiments of the present disclosure may further include a touch object locating unit 40 for determining the position of the intersection area of the touch object 20 and the imaging region D. In an embodiment, the position determined by the touch object locating unit 40 enables the touch marking unit 10 to project the touch mark 30 at the position.

The touch object locating unit 40 may include a laser radar. The position of the touch object such as a finger in the floating imaging region can be obtained by the laser radar. The laser radar may include at least one of a line-scan laser radar, a cone-scan laser radar, or a fiber-scan laser radar.

In an embodiment, the touch object locating unit includes a line-scan radar configured to scan laser light along a plane in which the floating imaging region is located. Though measuring the distance and orientation of the touch object by the line-scan radar, the intersection area of the touch object and the imaging region can be quickly located. Line-scan laser radar can reduce the amount of data calculation and simplify the structure of the touch object locating unit, which has the advantages of small size and low cost.

The laser radar emits light pulse. The light pulse is reflected by an obstacle (i.e., a touch object), and the reflected light pulse is received by the laser radar. The distance from the obstacle to the radar can be calculated by the time difference between emitting the light pulse and the receiving the light pulse. In addition, the radar is capable of measuring the azimuth relative to the radar of the obstacle. The laser radar can thereby determine the position of the touch object.

The touch object locating unit 40 may also include a depth camera. The depth camera is capable of projecting a structured light pattern (e.g., infrared light) into a target space (e.g., the space in which the touch object is located) to achieve calibration of the target space. For example, when a depth camera projects a spot with a specific structure onto a three-dimensional object, the observed spot structure will deform as changes of the viewing angle and the surface contour of the object. The contour data of the surface of the object can be obtained by analyzing the deformation of the spot. In this way, the spatial position of the touch object and the position of the touch object in the floating imaging region can be obtained through three-dimensional reconstruction.

In embodiments of the present disclosure, the touch marking unit may include a laser MEMS device. For example, as shown in FIG. 3, the touch marking unit includes a laser 101, a MEMS reflector 102, and a projection lens 103. The MEMS reflector 102 is used to change a projection direction of the laser light LA generated by the laser 101. Projection lens 103 is used to project laser light LA from MEMS reflector 102. The laser light LA is used to display the touch mark. The MEMS reflector can include a two-dimensional scanning MEMS micromirror (single mirror) or a digital micromirror device DMD (two-dimensional array). The laser light LA of the touch marking unit 10 may be visible light to obtain a better visual recognition effect of the touch mark.

Figure 4:
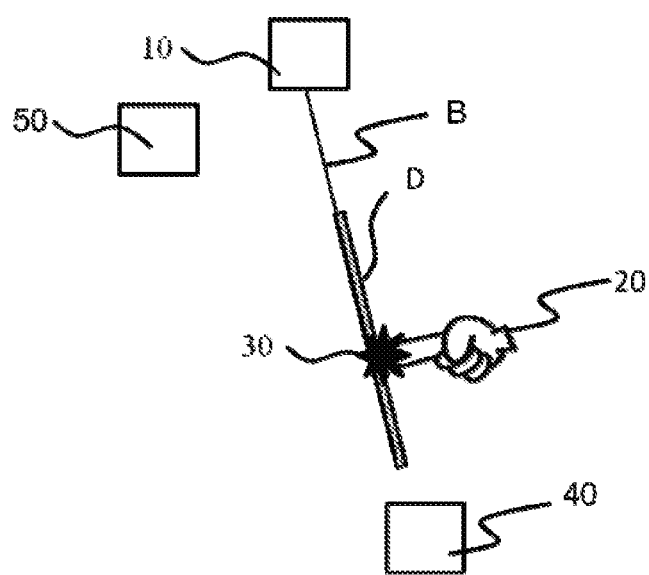
FIG. 4 is a schematic view of a floating display device according to embodiments of the present disclosure.

FIG. 4 is a schematic view of a floating display device according to embodiments of the present disclosure. As shown in FIG. 4, the floating display device further includes a control device 50. In an embodiment, the control device 50 controls, based on the position of the area where the touch object 20 intersects the floating imaging region determined by the touch object locating unit 40, the touch marking unit 10 to project the touch mark 30 to the intersection area P (see FIG. 2). In an embodiment, the control device 50 is configured to control the touch marking unit 10 to scan, at a predetermined frequency, the touch mark along a plane in which the floating imaging region D is located. In the latter embodiment, the predetermined frequency can be set high enough so that the human eye does not realize an interruption of the projection, so that a better visual marking effect can also be obtained.

The control device described herein may be implemented as a combination of a processor and a memory, wherein the processor executes a program stored in the memory to implement a corresponding function of the control device. The control devices described herein may also be implemented in a complete hardware implementation, including an application specific integrated circuit (ASIC), field programmable gate array (FPGA), and the like.

Figure 5:
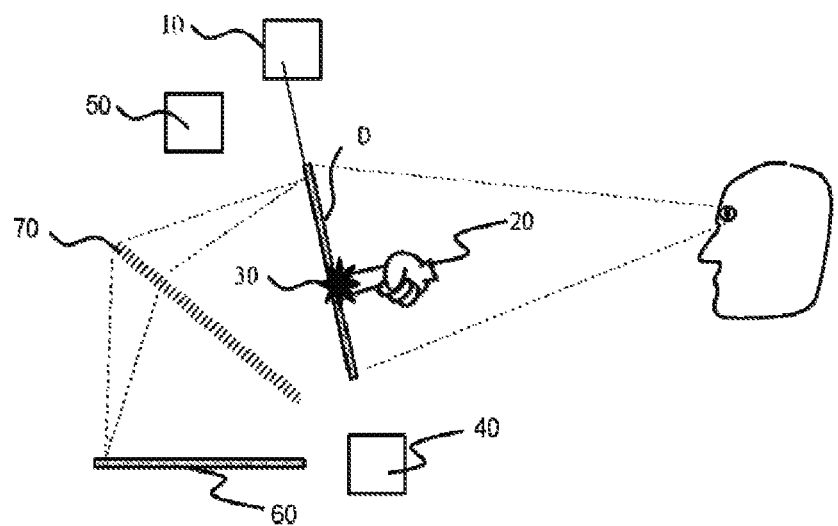
FIG. 5 is a schematic view of a floating display device according to embodiments of the present disclosure.

FIG. 5 is a schematic view of a floating display device according to embodiments of the present disclosure. As shown in FIG. 5, the floating display device according to embodiments of the present disclosure further includes a display unit 60 and a floating imaging unit 70 configured to generate a floating image in the floating imaging region D based on information from the display unit 60. The floating display can be realized by reflection or projection. For example, the floating imaging unit can include at least one of an optical fiber or an AI imaging plate. The display unit may include at least one of a liquid crystal panel, an OLED panel, or a quantum dot panel.

Embodiments of the present disclosure provide a method for the floating display device as described above to indicate the touch position. The method includes projecting the touch mark for marking the area where the touch object intersects the floating imaging region.

Figure 6:
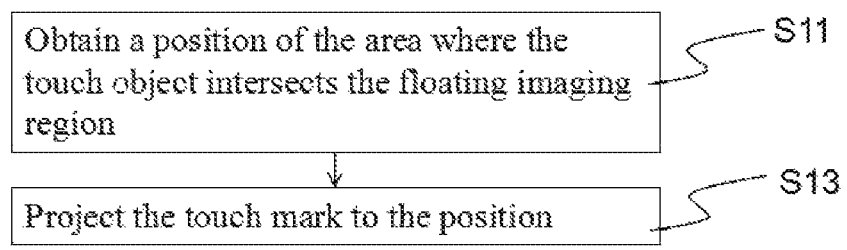
FIG. 6 is a flow chart of a method of projecting a touch mark at a portion of a touch object that intersects a floating imaging region, according to embodiments of the present disclosure.

As shown in FIG. 6, in embodiments of the present disclosure, the projection touch mark includes:

S11. Obtaining a position of the area where the touch object intersects the floating imaging region.

S13. Projecting the touch mark to the position.

For example, a touch object locating unit such as a laser radar may be employed to obtain a position of an intersection area of a touch object such as a finger and a floating imaging region. A touch marking unit, such as a laser MEMS device, then projects the touch mark to the position.

In an embodiment, the touch mark is scanned at a predetermined frequency along a plane in which the floating imaging region is located. In this case, as long as the predetermined frequency is high enough, a better visual marking effect can be achieved without the need to acquire the positional information of the area where the touch object intersects the floating imaging region.

The floating display device may further include a processor that can analyze and execute a touch operation instruction of the user according to a frequency, a position, a moving state, and the like of the touch object appearing in the floating imaging region D.

Having described certain specific embodiments, these embodiments have been presented by way of example only, and are not intended to limit the scope of the present disclosure. Indeed, the novel embodiments described herein may be embodied in various other forms, furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A floating display device comprising a touch marking unit, wherein the floating display device is configured to generate a floating image in a floating imaging region, wherein the touch marking unit is configured to project a touch mark for marking an area where a touch object intersects the floating imaging region, and wherein the touch marking unit is configured to scan the touch mark along a plane in which the floating imaging region is located to mark the area where the touch object intersects the floating imaging region.

2. The floating display device according to claim 1, wherein the touch marking unit comprises a laser, a MEMS reflector for changing a projection direction of a laser light generated by the laser, and a projection lens for projecting the laser light from the MEMS reflector to display the touch mark.

3. The floating display device according to claim 2, wherein the laser light comprises visible light.

4. A method for the floating display device according to claim 2 to indicate the touch position, the method comprising projecting a touch mark for marking an area where the touch object intersects the floating imaging region.

5. A method for the floating display device according to claim 3 to indicate the touch position, the method comprising projecting a touch mark for marking an area where the touch object intersects the floating imaging region.

6. The floating display device according to claim 1, further comprising a control device.

7. The floating display device according to claim 1, further comprising:
   a display unit; and
   a floating imaging unit, configured to generate a floating image in the floating imaging region based on information from the display unit.

8. A method for the floating display device according to claim 1 to indicate the touch position, the method comprising projecting the touch mark for marking the area where the touch object intersects the floating imaging region.

9. The method according to claim 8, wherein projecting the touch mark comprises:
   obtaining a position of the area where the touch object intersects the floating imaging region; and
   projecting the touch mark to the position.

10. The method according to claim 8, wherein projecting the touch mark comprises:
    scanning, at a predetermined frequency, the touch mark along a plane in which the floating imaging region is located.

11. The floating display device according to claim 1, further comprising a control device configured to control the touch marking unit to scan the touch mark at a predetermined frequency along a plane in which the floating imaging region is located.

12. A method for indicating a touch position of a floating display device comprising the floating display device according to claim 1, the method comprising projecting a touch mark for marking an area where the touch object intersects the floating imaging region.

\* \* \* \* \*